United States Patent [19]

Bracci

[11] 3,751,043

[45] Aug. 7, 1973

[54] TAPE MAGAZINE FOR RECORDER/REPRODUCER

[75] Inventor: George T. Bracci, Bedford, Mass.

[73] Assignee: Viatron Computer Systems Corp., Bedford, Mass.

[22] Filed: Mar. 23, 1970

[21] Appl. No.: 21,727

[52] U.S. Cl. ........... 274/4 C, 179/100.2 Z, 242/199

[51] Int. Cl. ....................... G11b 23/10, G11b 15/60

[58] Field of Search .................... 242/199, 200, 197, 242/198, 183, 209, 76, 210, 194, 201, 202, 203, 204, 206, 207, 208; 179/100.22; 274/4 C, 11 C, 4 D, 4 E

[56] References Cited

UNITED STATES PATENTS

| | | | |
|---|---|---|---|
| 3,432,111 | 3/1969 | Ryder | 242/199 |
| 3,596,006 | 7/1971 | Lawhon | 179/100.2 Z |
| 3,598,339 | 8/1971 | Saito | 242/199 |
| 3,625,455 | 12/1971 | Streets | 242/199 |
| 3,556,433 | 1/1971 | Abitboul | 242/199 |
| 3,549,104 | 12/1970 | Morrow et al. | 242/209 |
| 3,495,787 | 2/1970 | Wallace | 242/199 |
| 3,294,331 | 12/1966 | Wang et al. | 242/183 |
| 3,529,788 | 9/1970 | Sasaki et al. | 242/199 |

*Primary Examiner*—George F. Mautz
*Attorney*—Charles Hieken

[57] ABSTRACT

A magazine or cassette is disclosed of the type having a hollow case containing a magnetic recording tape arranged for being driven back and forth between spaced hubs positioned within the casing. The path of the tape from one hub to the other runs adjacent to one narrow sidewall of the case so that the tape is exposed to recorder/reproducer heads through one or more apertures in that sidewall. The magazine is adapted for high speed two directional multi-speed tape operation with digital or other computers and includes an improved low friction skew resisting tape mounting including a pair of low friction shim members positioned between the tape and the casing walls. The magazine is also adapted for hub drive of the tape in both directions within the casing and includes improved integral control devices on the casing for precision insertion and for protecting against double recording and against improper insertion of the magazine into the recorder/reproducer.

5 Claims, 7 Drawing Figures

INVENTOR.
GEORGE T. BRACCI
BY
[signature]
ATTORNEY

TAPE MAGAZINE FOR RECORDER/REPRODUCER

BACKGROUND OF THE INVENTION

The present invention relates to an improved recorder/reproducer magazine of the type now commonly known as a cassette where a recording tape is contained entirely within the cassette casing for movement back and forth between to spaced hubs.

Prior magazines or cassettes of this general type have been developed for various applications including voice and music recording. One prior magazine of this general type is described, for example, in U.S. Pat. No. 3,394,899 issued on July 30, 1968.

The improved magazine of the present invention is more particularly adapted for use in the recording and reproducing of digital or pulsed data and for recording and reproducing such data for a relatively high number of replay cycles with digital reliability and at relatively high speeds. Additionally, the magazine of the present invention is particularly adapted for such use where it may be easily inserted and removed from a recorder/reproducer device using a hub drive means as contrasted with the direct tape driving capstans used prior magazines such as that of the above noted patent.

The magazine in accordance with the present invention is particularly adapted for a hub-type drive system and forms a tape transport arrangement of extremely low drive torque, minimal dynamic skew, and with reduced "stiction," i.e., a reduced tending to jitter or jump. The tape is subjected to minimal wear even though the tape is run through many cycles and even though it may be reversed in direction with great rapidity and many times during the movement of the tape from one hub to the other in a manner which is typical for many data processing operations.

Accordingly, an object of the present invention is to provide an improved tape magazine or cassette for use in digital or computer applications.

Another object of the present invention is to provide an improved tape magazine or cassette of the hub drive type which operates with extremely low drive torques and with a minimum degree of tape wear and without objectionable dynamic skew.

Another object of the present invention is to provide an improved tape magazine or cassette which is readily inserted and removed from a recorder/reproducer and which includes improved no-write and improper loading signaling means.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawing, forming a part of the specification, wherein.

DESCRIPTION OF THE PREFERRED EMBODIMENT

Figures 1, 2, 3, 4, 5, 6, 7:
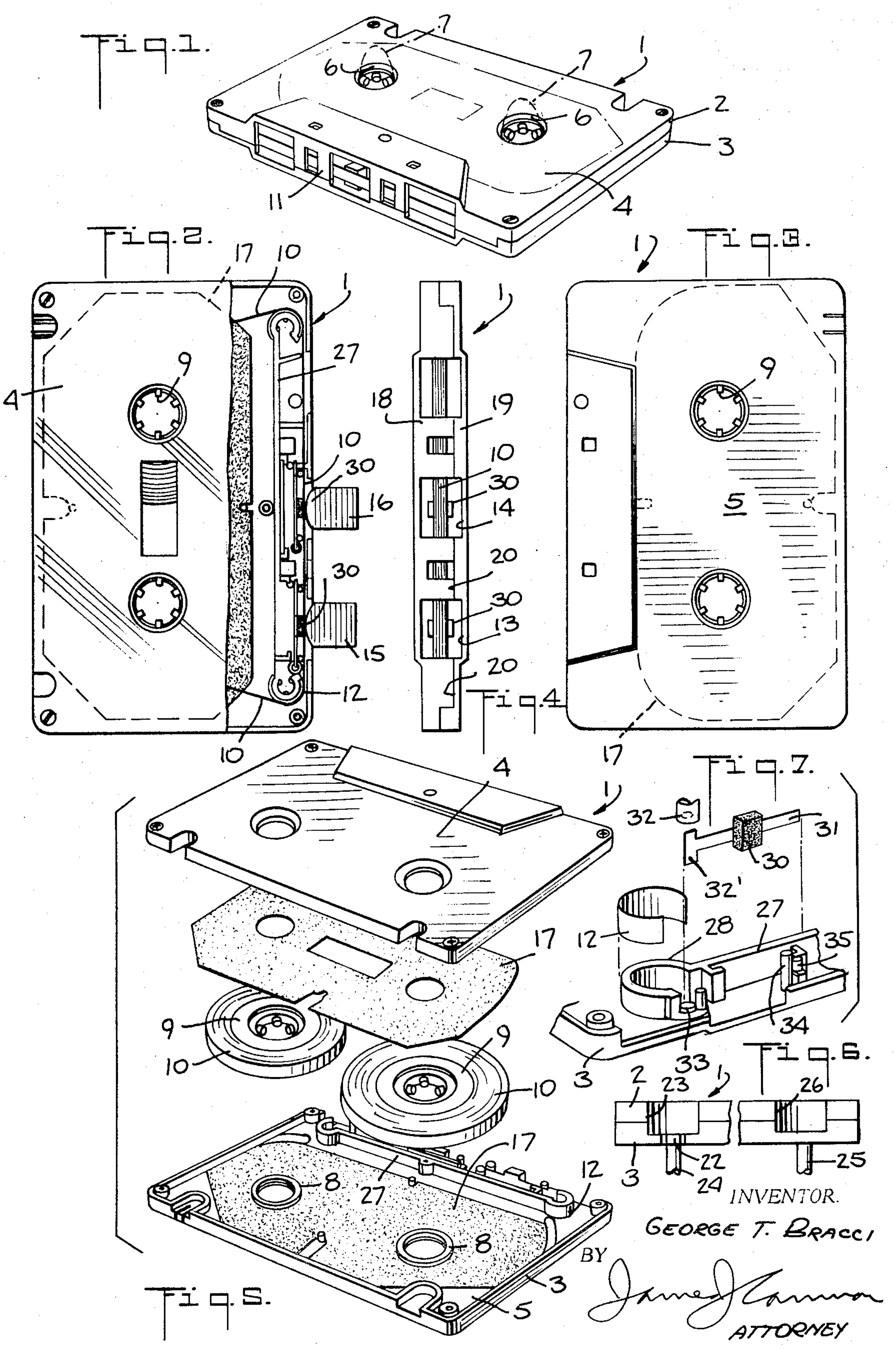
FIG. 1 is a perspective view of a preferred embodiment of the improved magazine in accordance with the present invention.
FIG. 2 is a top plan view partially cut away of the magazine of FIG. 1.
FIG. 3 is a bottom plan view of the magazine.
FIG. 4 is a front elevational view of the magazine.
FIG. 5 is an exploded perspective view of the magazine.
FIG. 6 is a rear elevational view of the magazine partially cut away.
FIG. 7 is a fragmentary enlarged perspective view illustrating preferred embodiments of the tape guide posts and the tape back-up pads.

The magazine 1 comprises a hollow casing which is preferably formed of molded plastic and which consists of a hollow top 2 and a hollow bottom 3. The top 2 and bottom 3 include generally flat outer walls 4 and 5, respectively, surrounded by depending front, rear and side wall portions so that the top 2 and the bottom 3 when assembled comprise a generally hollow substantially rectangular case. The top 2 and bottom 3 include a pair of spaced circular apertures 6 through which a pair of turntables or spindles 7 of the recorder/reproducer pass. Upstanding rims 8 are formed on the inside of the top 2 and bottom 3 and surrounding the spindle apertures 6 for rotatably mounting two tape hubs 9.

As best seen in FIGS. 2 and 5, a supply of tape 10 is wound around one hub 9 and the tape 10 is led along a path extending along the front wall 11 of the magazine 1 to the other hub 9. This path carries the tape 10 around a pair of stationary guide posts 12 positioned at opposite corners of the magazine 1 and past several apertures in the magazine front wall including apertures 13 and 14 which expose the tape to recorder 1 reproducer heads such as a control head 15 and a data head 16. The posts 12 are preferably formed of a non-magnetic metal such as brass to provide a guide giving minimal dynamic skew when the tape 10 is driven from the hubs 9.

The passage of the tape from one reel to the other with a low drive torque and with a minimum of tape edge wear is facilitated by the positioning of a pair of sheet-like shims 17 between the hubs 9 and the casing walls 4 and 5 as illustrated in FIG. 5. As illustrated in FIG. 4, the depending side wall portions 18 and 19 on top 2 and bottom 3 which form the casing front wall 11 are formed principally on one portion 2 or 3 with the height of one of the front side wall portions greater than that of the other front side wall portion so that the parting line 20 is clear of the tape surface.

The movement of the tape 10 and in particular, high speed reversals and unexpectedly long and improved tape life, have been obtained by forming the shims 17 of materials having extremely low surface friction and low state build-up surfaces.

One preferred material which has been found to provide greatly improved tape drive characteristics and extended tape life is a relatively thin sheet of carbon-filled polytetrafluoroethylene or TFE. This material having a preferred thickness of the order of 0.004 inch is formed by extruding a mixture of TFE and carbon particles so that the resultant cured and extruded sheet is a combination of TFE impregnated with particles of carbon which has a lubricated surface and which is free of static build-up. Such sheets are commercially available, for example, from the Dixon Corporation of Bristol, Rhode Island.

Another embodiment of the improved shims comprises similarly proportioned sheets formed of woven fiberglass with a filling of TFE and carbon particles.

Magazines including the above tape arrangements have been found to be useful in recording and reproducing operations where the tapes have been run through over 100 cycles at extremely high tape speeds with continuing low tape drive torques.

The improved magazine in accordance with the present invention includes an improved no-write means in the form of a small removable tab 22 formed in a notch 23 as an integral portion of the casing bottom 3. This tab 22 when left in position engages and depresses a write switch arm 24 as illustrated by the solid switch arm 24 in FIG. 6. When the magazine 1 is positioned in this manner in the recorder/reproducer, the write or record signals are fed to the tape recording head. When a magazine 1 has been completed so that no further information is to be recorded on it, the small tab 22 may be broken off from the magazine 1. After this, the entry of the magazine 1 into the recorder/reproducer will not depress the write switch arm 24 and the recording signals are not fed to the recorder head. In order to insure that the magazine 1 is always positioned with its top side uppermost, a positioning switch arm 25 is provided to be engaged by a cooperating portion of the casing bottom 3. As best see in FIG. 6, the cartridge bottom 3 activates the positioning switch arm 25 when the magazine is properly inserted in the recorded/reproducer permitting the tape drive and recorder system to operate. Should the magazine be inadvertently inverted when being loaded into the recorder/reproducer, the notch 23 will receive switch arm 25 to deactivate the recorder/reproducer. To further protect the data, a notch 26 is preferably included to receive the no-write switch arm 24 when the cassette is inverted.

The casing is seen to include a partition 27 positioned inwardly of the front wall apertures 11 to prevent the entrance of dust or other contaminants. The arcuate end portions 28 of the partition 27 provide a support for the arcuate guide posts 12.

Spring mounted resilient pressure pads 30 are also mounted on suitable integral supports provided on the magazine top and bottom portions.

FIG. 7 illustrates a preferred mounting for the pressure pads 30. A brass or other resilient non-magnetic support arm 31 has one T-shaped end 32 locked in position between sockets 32 and 33 provided in the top 2 and the bottom 3 of the casing to be fixed at that end. The other end is held in a slot formed between posts 34 and 35 provided on the casing bottom allowing movement of that end in a direction parallel to the apertured wall. The pressure pad 30 is seen to be resiliently mounted to press against the tape 10 and to also be held against movement in the direction of the tape so that any jerking or "striction" of the moving tape is eliminated.

It will be seen that an improved tape magazine or cassette has been provided which is particularly adapted for use in applications in digital or similar computer operations. The improved magazine is particularly suited for direct hub driven tape drives and for use where the tape is subjected to rapid reversals and to numerous runs in a low torque drive system. The magazine provides for high speed intermittent and reverse tape movement with minimal wear and is also adapted for easy and fool-proof precision entry and removal in recorder/reproducers of computer or console type.

As various changes may be made in the form, construction and arrangement of the parts herein without departing from the spirit and scope of the invention and without sacrificing any of its advantages, it is to be inderstood that all matter herein is to be interpreted as illustrative and not in a limiting sense.

What is claimed is:

1. In a magazine for recorder/reproducer tape in which the tape is passed within a hollow casing between spaced hubs rotatively mounted within the casing and where apertures are provided in a side wall of the casing adjacent to a portion of the tape path between the hubs, the improvement comprising an elongated shield-like partition within said casing extending generally parallel to and spaced from said apertured side wall and formed with arcuate ends, and a pair of arcuate stationary metallic non-magnetic tape guide members positioned at opposite ends of said partition snugly surrounding respective ones of said arcuate ends for guiding the tape around the ends of said partition, pressure pads positioned within said casing adjacent one or more of said apertures, and resilient mounting means for said pads, said resilient mounting means comprising an elongated spring, slot forming means on said casing loosely confining one end of said spring allowing movement of said one end in a direction parallel to said apertured side wall, and means on said casing engaging the opposite end of said spring for keeping said opposite end fixed.

2. The magazine as claimed in claim 1 in which said casing comprises a top and bottom portion each comprising a generally flat outer wall and depending side wall portions forming the side walls and the side wall having said apertures being a front side wall with the height of one of the front side wall portions greater than that of the other front side wall portion so that the parting line between said portions is clear of the surface of said tape.

3. In a magazine for recording tape in which the tape is passed within a hollow casing between spaced hubs rotatively mounted within the casing and where apertures are provided in a side wall of the casing adjacent to a portion of the tape path between the hubs, the improvement comprising, pressure pad means positioned within said casing adjacent at least one of said apertures, elongated spring means carrying said pressure pad means, slot forming means on said casing loosely confining one end of said spring means allowing movement of said one end in a direction parallel to said apertured side wall, and means on said casing engaging the opposite ends of said spring means to keep said opposite end fixed.

4. The magazine as claimed in claim 3 in which said casing comprises a top and a bottom portion each comprising a generally flat outer wall and depending side walls, and a removable tab in the flat outer wall of one of said portions positioned to activate a write switch when the magazine is placed in a recorder/reproducer, the other of said portions being formed with a notch opposite said removable tap for accommodating a switch arm of a recorder/reproducer to deactivate the latter when said magazine is inserted therein with said tab spaced from said write switch by said other portion.

5. The magazine as claimed in claim 4 in which the apertured side wall is formed by depending side wall portions on said outer walls which engage each other along a parting line spaced laterally of the tape whereby said tape engages no portion of the parting line.

* * * * *